(12) United States Patent
Shaffer

(10) Patent No.: US 6,308,632 B1
(45) Date of Patent: Oct. 30, 2001

(54) DEPLOYABLE FOLDED PROPELLER ASSEMBLY FOR AERIAL PROJECTILES

(76) Inventor: James E. Shaffer, 1780 Geronimo Trail, Maitland, FL (US) 32751

( * ) Notice: Subject to any disclaimer, the term of this patent is extended or adjusted under 35 U.S.C. 154(b) by 0 days.

(21) Appl. No.: 09/447,972

(22) Filed: Nov. 22, 1999

Related U.S. Application Data

(60) Provisional application No. 60/109,375, filed on Nov. 23, 1998.

(51) Int. Cl.[7] .............................. F42B 15/00; F04D 29/20
(52) U.S. Cl. .................... 102/388; 102/293; 102/400; 102/501; 416/142; 416/87; 416/140
(58) Field of Search ...................................... 102/388, 400, 102/293, 501, 399; 416/142, 134, 87, 212, DIG. 3, 140

(56) References Cited

U.S. PATENT DOCUMENTS

| | | | |
|---|---|---|---|
| 866,369 | * | 9/1907 | Learnard . |
| 3,709,634 | | 1/1973 | Lorenz . |
| 4,072,107 | * | 2/1978 | Saxe et al. ................. 102/4 |
| 4,204,806 | | 5/1980 | Blachard . |
| 4,364,711 | * | 12/1982 | Brandt et al. ........... 416/142 |
| 4,726,292 | * | 2/1988 | Gatti ..................... 102/227 |
| 4,768,927 | | 9/1988 | Munk . |
| 4,801,243 | * | 1/1989 | Norton ................... 416/89 |
| 4,936,526 | | 6/1990 | Gries . |
| 4,986,185 | | 1/1991 | Kuhnle et al. . |
| 5,299,912 | * | 4/1994 | Fradenburgh et al. ....... 416/87 |
| 6,152,693 | * | 11/2000 | Olsen et al. .............. 416/87 |

* cited by examiner

Primary Examiner—Charles T. Jordan
Assistant Examiner—Kimberly S Smith
(74) Attorney, Agent, or Firm—Terry M. Sanks, Esq.; David G. Maire, Esq.; Beusse Brownlee Bowdoin & Wolter, P.A.

(57) ABSTRACT

An apparatus for deploying a propeller assembly from a folded configuration to a deployed, operational configuration, the apparatus comprising a propeller assembly hub which in conjunction with a propeller hub nut maintains an aerodynamically efficient shape after the propeller assembly is deployed, the propeller hub nut which is diametrically large enough to allow assembly of a drive shaft and a drive shaft bevel gear and includes a cavity to accept a spring detent, a propeller blade which protrudes from a journal located in the surface of the propeller assembly hub where when in its folded configuration, the propeller blade is in the same parallel axial direction as the drive shaft and when deployed is nutated to a radially outwardly extending operative position in response to rotating of a propeller blade bevel gear, the drive shaft rotated about its axis where one end engages a prime mover and a second distal end engages the hub nut, drive shaft bevel gear fixed to the drive shaft near the distal end which engages the propeller blade bevel gear, the propeller blade bevel gear connected to the propeller blade inside of the propeller assembly hub which engages the drive shaft bevel gear and rotates as a result of the drive shaft bevel gear rotating in unison with the drive shaft, a means to prevent the propeller blades from nutating beyond the operational configuration, a means to reduce friction between the hub nut and the drive shaft, a shear pin to statorize the propeller assembly hub prior to operating the deployed propeller assembly, and a means to break the sheer pin after the propeller assembly has achieved the deployed, operational configuration.

20 Claims, 5 Drawing Sheets

DEPLOYABLE FOLDED PROPELLER ASSEMBLY FOR AERIAL PROJECTILES

SPECIFIC DATA RELATED TO APPLICANT

This application takes benefit of provisional application serial no. 60/109,375 filed Nov. 23, 1998.

BACKGROUND OF THE INVENTION

The present invention relates to a propeller assembly, and more specifically to an apparatus and method for deploying a propeller assembly, a which is diametrically larger than an aerial projectile's diameter, from a folded configuration to a deployed configuration during the fight of the aerial projectile.

Some projectiles, which require a propeller assembly, are fired from a gun or some other launching system that has a constricted launch area. These projectiles may have a propeller assembly that is diametrically larger than the projectile's diameter. The gun or other launching system may have a constricted launch area that may only contain the projectile body but not the diametrically larger propeller assembly.

One option for fitting both a projectile and its propeller assembly inside a limited launch area is to package the propeller assembly so that the propeller blades are not diametrically larger than the projectile prior to launch. For example, it is believed that U.S. Pat. No. 4,986,185 discloses dual blade propellers made of flexible metal or fabric loops or strips. The propeller blades are folded in a closely packed, nesting arrangement. However, this prior art is designed to deploy the propeller blades as soon as the projectile is free of the restricted launch area. Furthermore, the blades are loops, thus each blade has a limited surface area.

Propeller blades hinged to a hub are also known in the prior art. For example, it is believed that U.S. Pat. No. 4,204,806 discloses a foldable marine propeller assembly that is attached to a drive shaft. Though the folded propeller assembly appears to have an aerodynamically efficient configuration, once employed, the area once occupied by the propeller blades is now a flat, blunt area that is no longer as aerodynamically efficient.

Accordingly, it would be advantageous to provide an apparatus and method that is simple and robust enough to deploy solid propellers other than immediately after launch where the propeller blades are capable of withstanding the environment experienced in launching the projectile. It would also be advantageous for the propeller assembly to maintain an aerodynamically efficient configuration after the deployment of the propeller blades.

SUMMARY OF THE INVENTION

One object of the present invention is to provide a highly reliable method for rapidly deploying a folded propeller assembly to an operational configuration where a minimum of the components is under stress prior to deployment. The propeller assembly comprises several components including a drive shaft, drive shaft bevel gear, hub, nut hub, journal, propeller blades, and propeller bevel gears. The propeller blade in an integral unit, consisting of a foil, attachment shaft, and a propeller base. Since the propeller blades are integral units, the propeller blades nutate from the folded configuration to an operational configuration. Nutating the propeller blades into its operational configuration allows for the hub and hub nut to be designed in an aeronautically efficient configuration such as a conical shape.

In one embodiment of the present invention, the propeller blades are initially stowed or folded and the hub is statorized, or physically held in place, against the projectile. An engine or some other prime mover causes the drive shaft to rotate, which in turn activates the bevel gears inside of the statorized hub. The rotating of the bevel gears nutates the propeller blades within the statorized hub from a folded position to a deployed operational position. At the end of deployment within the statorized hub a stopper device, for example a spring loaded detent secures the drive shaft to the statorized hub and then a shear pin is broken freeing the now bladed hub to turn with each revolution of the drive shaft.

DETAILED DESCRIPTION OF THE INVENTION

Figure 1:
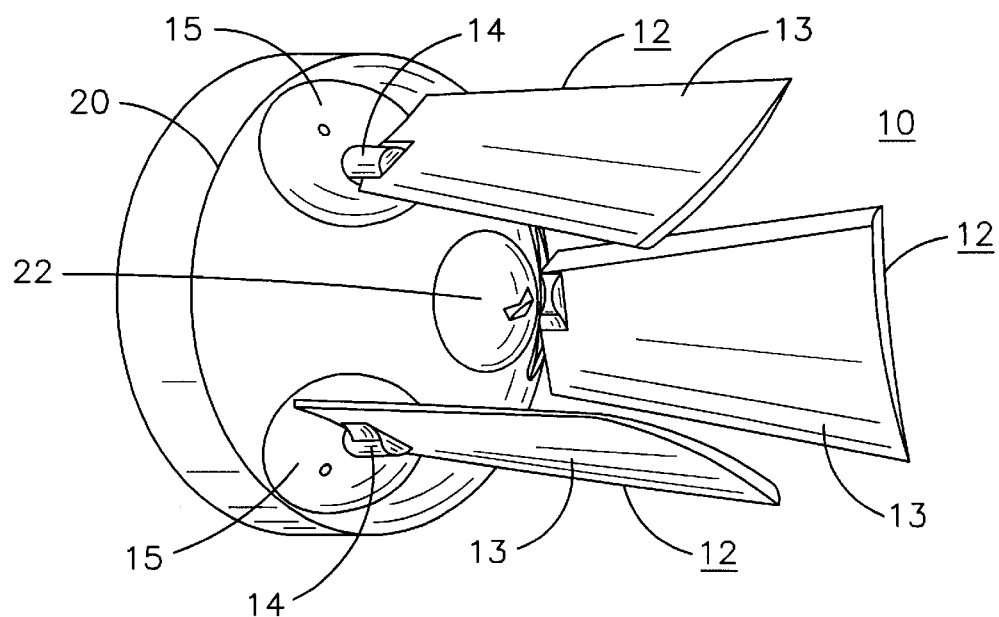
FIG. 1 is a perspective drawing of the integrated propeller assembly with the propeller blades in folded configuration, with a shear pin intact.
Figure 2:
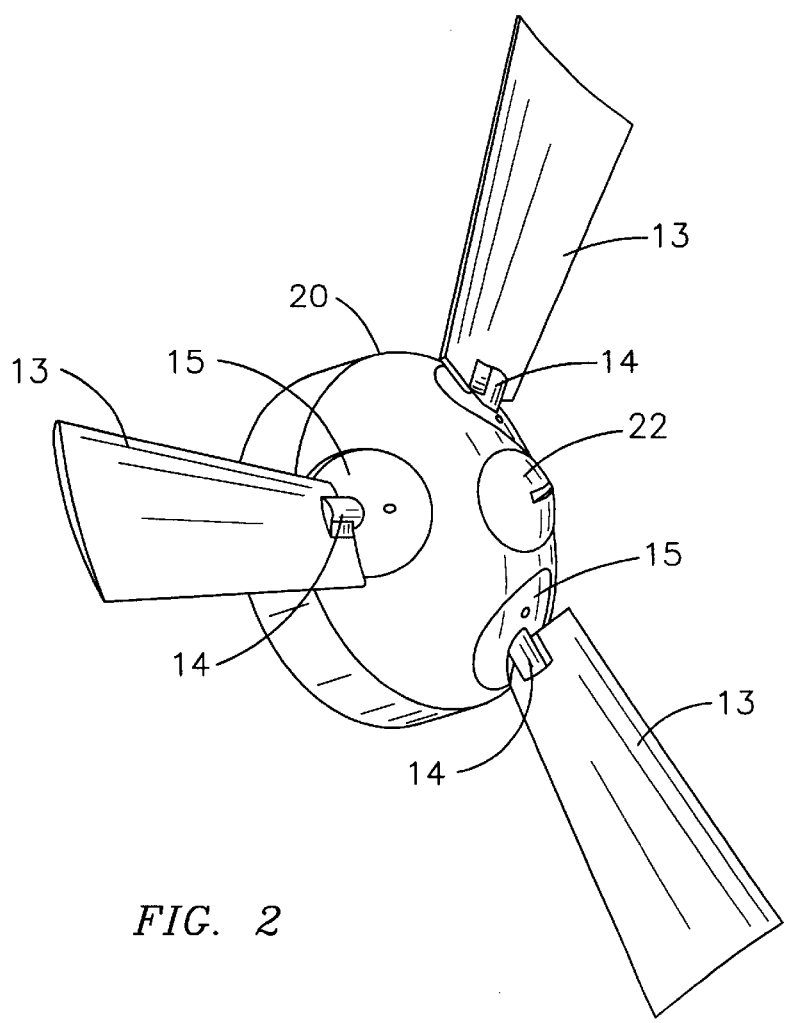
FIG. 2 is a perspective drawing of the integrated propeller assembly with the propeller blades in a deployed configuration, with a shear pin broken.
Figure 3:
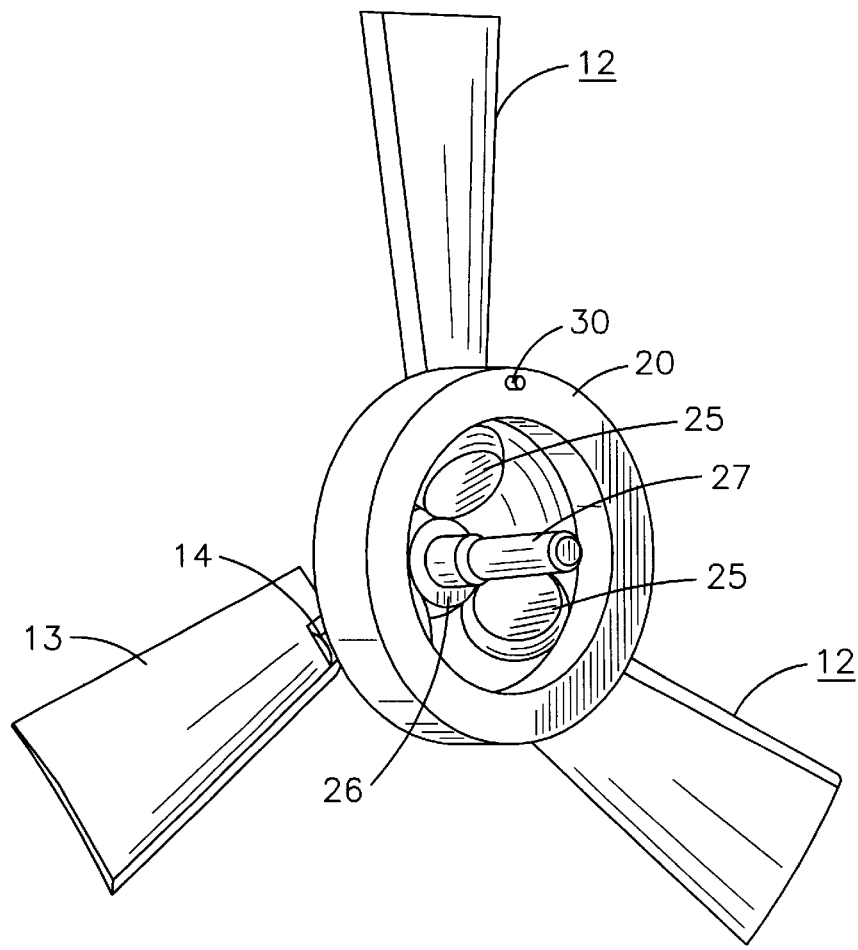
FIG. 3 is a perspective drawing, from the underside of the integrated propeller assembly, with the propeller blades deployed, immediately before the breaking of a shear pin.

FIG. 1 is a perspective drawing of the integrated propeller assembly with the propeller blades in folded configuration, with a shear pin intact and FIG. 2 is a perspective drawing of the integrated propeller assembly with the propeller blades n a deployed configuration, with a shear pin broken. In the embodiments of FIGS. 1 and 2, each propeller blade 12 in an integral unit that is comprised of a foil 13, attachment shaft 14, and propeller base 15. Each propeller base 15 is located within a journal 17 in a propeller assembly hub, or propeller housing 20. The propeller blades 12 are equally spaced from each other. The propeller assembly hub 20 is dome-like in shape with a conical sidewall extending downward from the base of the dome. As better illustrated in FIGS. 4 and 5, a shear pin 30 extends from the underside of the conical sidewall. In the center of the propeller housing 20 is a housing nut, or hub nut, 22 which is large enough in diameter to allow assembly of a bevel gearheaded drive shaft 26, 27 as illustrated in FIG. 3. The hub nut 22 also functions to pre-load the drive shaft bevel gear 26 into bevel gears 25 attached to the underside of each propeller base 15, as illustrated in FIG. 3.

Figure 4:
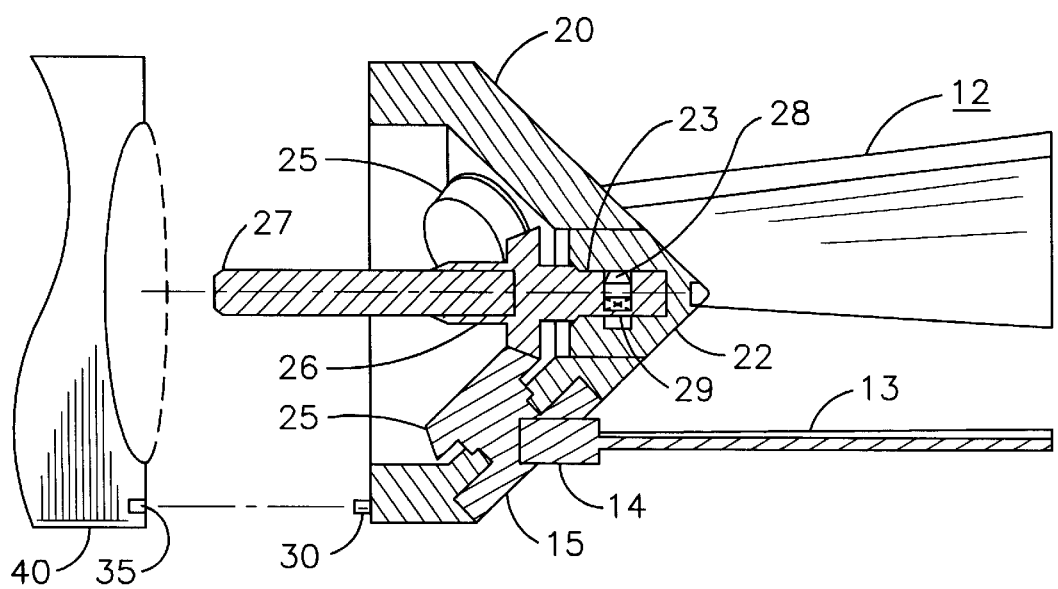
FIG. 4 is a partial cross sectional view of the integrated propeller assembly with the propeller blades in a folded configuration.

FIG. 3 is a perspective drawing, from the underside of the integrated propeller assembly, with the propeller blades deployed, immediately before the breaking of a shear pin. The embodiment of FIG. 3 includes a propeller blade bevel gear 25 that is connected to each propeller blade 12. The propeller blade bevel gears 25 are engaged with a drive shaft bevel gear 26. Since a gear does not need to be beveled 360° around the circumference, the propeller blade bevel gears 25 may be manufactured where, for example, only 180° of the gear is beveled. In the preferred embodiment, the drive shaft bevel gear 26 is an integral unit with a drive shaft 27. One end of the drive shaft 27 extends to a prime mover (not shown) which is capable of rotating the drive shaft 27. The other end extends into the housing nut 22, as viewed in FIGS. 4 and 5. Extending from the base of the propeller assembly hub 20 is a shear pin 30. As illustrated in FIG. 4, the shear pin 30 fits within a cavity 35 located on the surface of a projectile 40. The shear pin 30 statorizes the housing assembly 20 until the blades are deployed to a stop, which then causes the shear pin 30 to be severed by the continued rotation of the drive shaft 27 by the prime mover.

Figure 5:
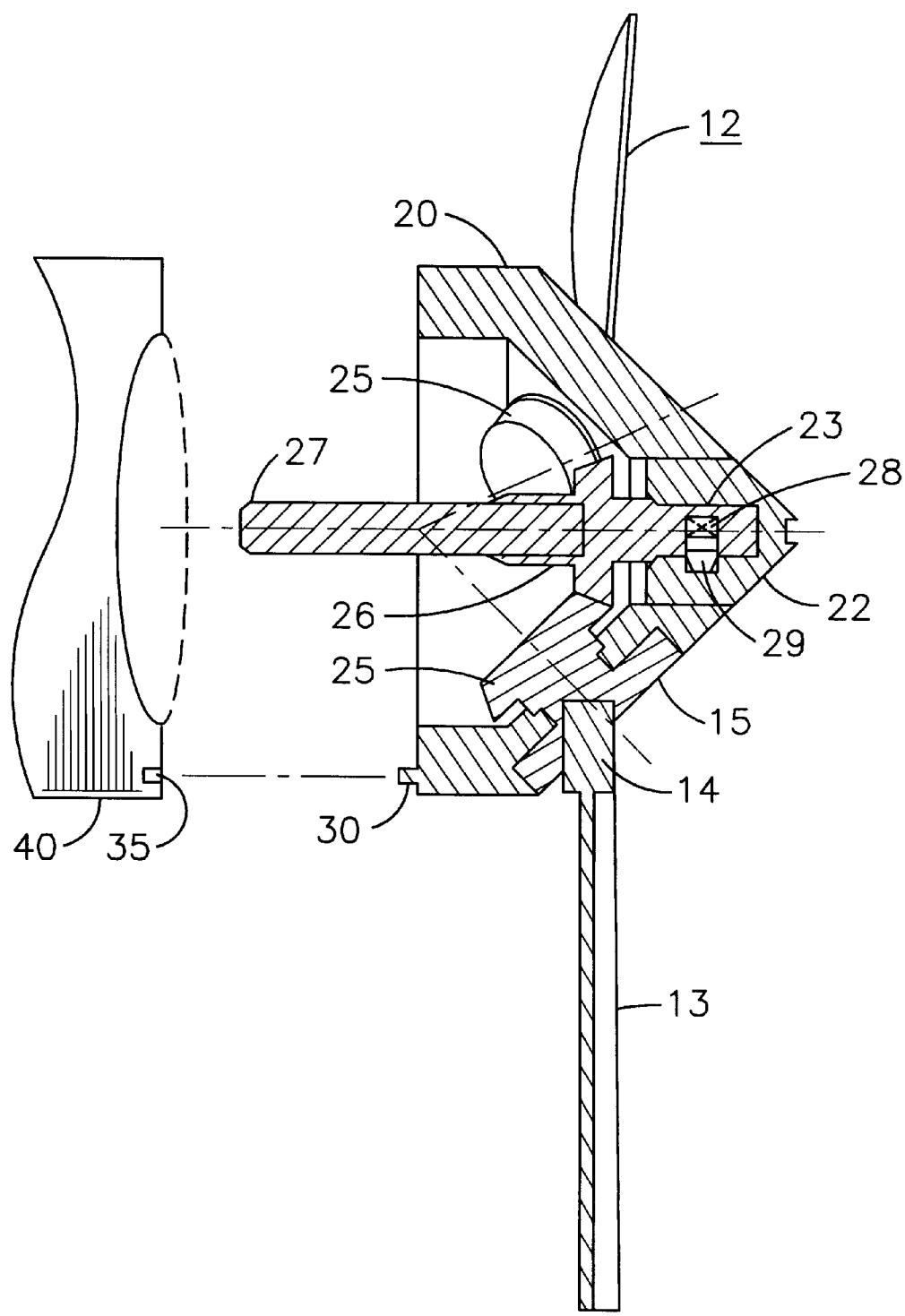
FIG. 5 is a partial cross section view of the integrated propeller assembly with the propeller blades in a deployed configuration, immediately before breaking the shear pin.

FIG. 4 is a partial cross sectional view of the integrated propeller assembly with the propeller blades folded, and FIG. 5 is a partial cross sectional view of the propeller assembly with the propeller blades deployed. The embodiments of FIGS. 4 and 5 show an integrated drive shaft 27 and drive shaft bevel gear 26. The outer circumference of the hub nut 22 is a threaded to match threads located within the opening or hole of the hub 20 which accepts the hub nut 22. The housing nut 22 has a cavity 23 that is smooth to reduce friction. The end of the drive shaft 27 that fits within the cavity 23 is also smooth to reduce friction. A friction reducing device is used to further reduce friction.

For example, in an exemplary embodiment of the present invention, a drive shaft includes a cavity 51 for a ball bearing 53 located at the end of drive shaft through its axial center. A second cavity 55 is also included in the housing nut 22 to accept the ball bearing 53. In another embodiment a substance, such as Teflon, coats the cavity 23 within the hub nut 22 and/or the end of the drive shaft 27 that fits within the housing nut cavity 23.

Imbedded within the end of the drive shaft 27 that fits within the housing nut cavity 23 is a spring detent 28. As the drive shaft 27 is turned by the prime mover, the bevel gear assembly 25, 26 causes the integrated propeller blades 12 to nutate into a deployed configuration. Once the propellers come to a stop, the spring detent 28 is aligned with a receiving cavity 29 inside of the housing nut 22 and imbeds itself into the receiving cavity 29. With the detent 28 imbedded within the receiving cavity 29, the propeller assembly 10 is free to turn with the drive shaft 27 except for the shear pin 30 holding the propeller assembly 10 stationary to the projectile 40. The force applied by the rotating of the drive shaft and propeller assembly 10, 27 stresses the shear pin 30 until the shear pin 30 breaks whereby the deployed propeller assembly 10 freely rotates with the drive shaft 27.

Figure 6:
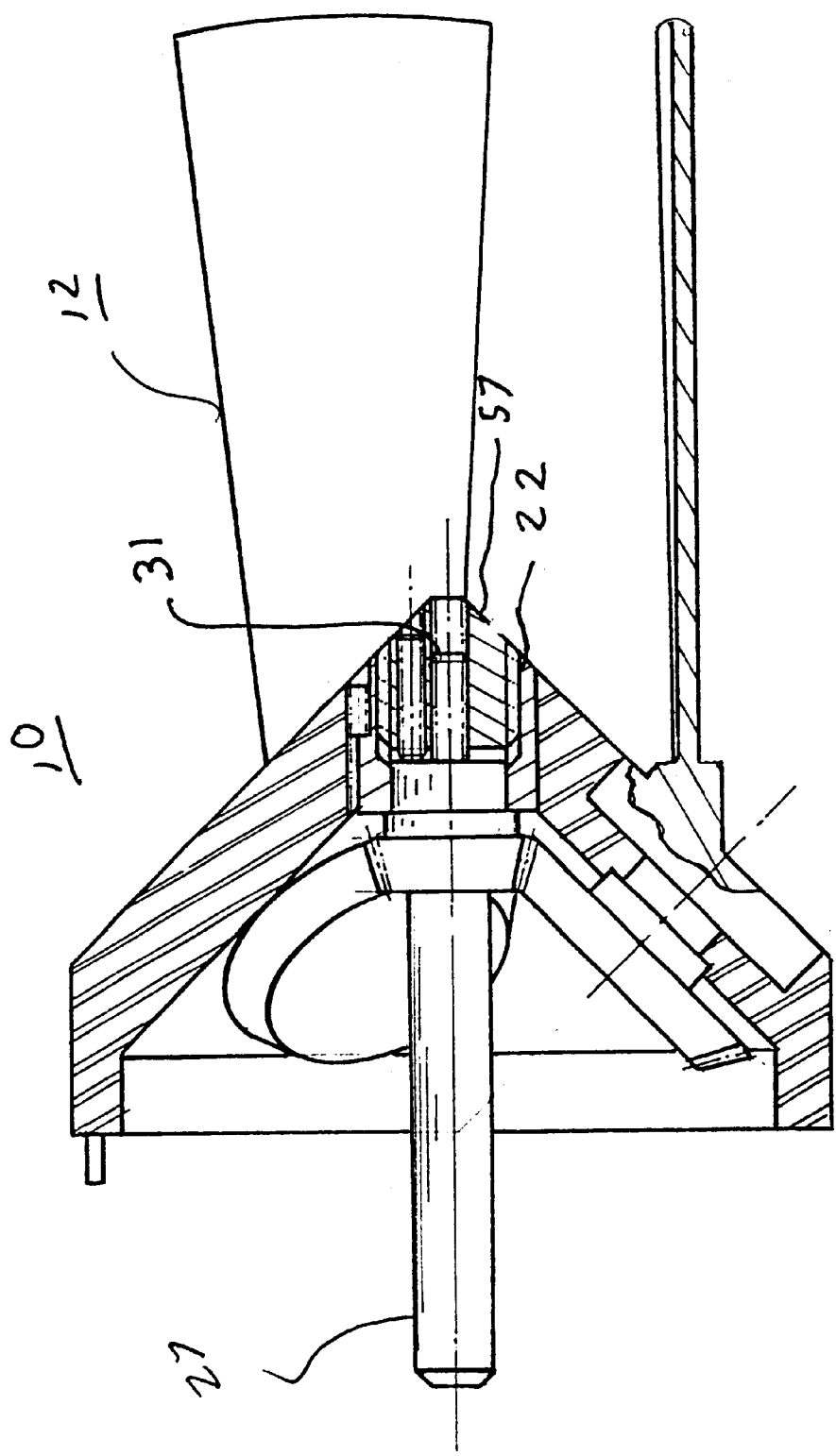
FIG. 6 is a partial cross sectional view of another embodiment of a hub nut within the integrated propeller assembly with the propeller blades in a folded configuration.

FIG. 6 is a partial cross sectional view of another embodiment of a hub nut within the integrated propeller assembly with the propeller blades in a folded configuration. In the embodiment of FIG. 6 the hub nut 22 is composed of an outer segment and an inner segment which is a spline 57 which is an axially translating nut that allows the spline to move in and out without rotary motion. The drive shaft 27 is threaded at an end 31 that fits within and engages the threads within the spline 57.

Figure 7:
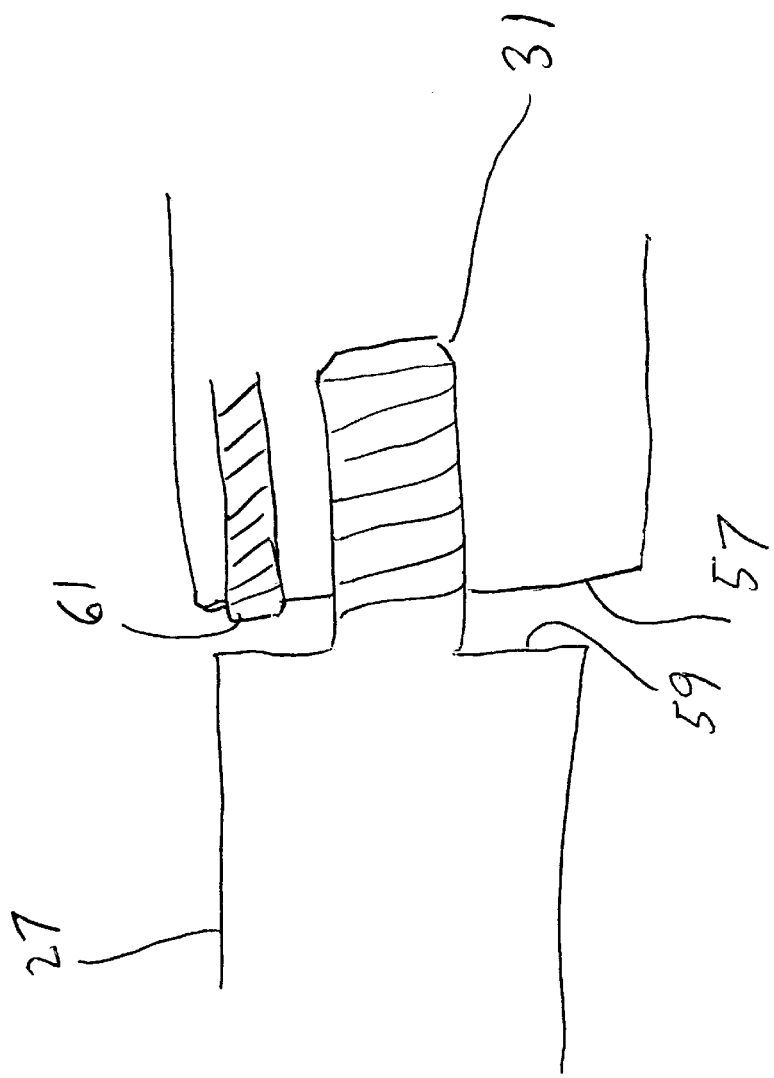
FIG. 7 is an exploded view of the adjustable mechanism illustrated in FIG. 6.

FIG. 7 is an exploded view of the adjustable mechanism illustrated in FIG. 6. As illustrated in FIG. 7, a mechanism 61 to adjust the maximum deployed position of the propeller blades after they nutate extends between the base of the spline 57 and a mating surface 59 on the drive shaft 27. In the preferred embodiment, the adjustable mechanism is a bolt or screw having an end protruding from the spline 57. An opposed end of the bolt or screw may be accessible from outside the propeller assembly 10 for precise adjustment of the position of the propeller 12 in the fully deployed position.

In operation, as the drive shaft 27 rotates, a threaded end 31 of the drive shaft 27 engages the spline 57 and draws it toward mating surface 59. As the drive shaft 27 rotates, propeller blade 12 nutates toward the deployed position. When the fully deployed position is achieved, the adjustable mechanism 61 makes contact with the mating surface 59. At this stage, the spline 57 is no longer free to move toward mating surface 59, and thus it begins to rotate with drive shaft 27, thereby rotating hub 20 with drive shaft 27. In this position all components of the propeller assembly 10 are stationary with respect to each other and the shaft 27 is now attempting to rotate the propeller assembly 10 with respect to projectile 40. The force exerted by the rotating drive shaft 27 and propeller assembly 10 stresses the shear pin 30 until the shear pin 30 breaks whereby the deployed propeller assembly 10 freely rotates with the drive shaft 27.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed:

1. A propeller assembly for use with an aerial projectile where said aerial projectile has an elongated shape with an outer surface, the propeller assembly comprising:

a propeller hub comprising a cylindrical shape with an outer wall, inner wall, open base, and a dome-shaped top, defining an inner chamber where said top has a first hole at the center of said top and a journal formed in said top and said propeller hub is statorized to said aerial projectile;

a propeller blade, said blade comprises a base rotatably retained in said journal;

propeller hub nut having a first end fitted within said first hole of said hub and a second distant end being dome-shaped wherein said first end comprises an outer wall and inner wall, defining a cavity therein;

propeller blade bevel gears fixed to said base of said propeller blade and disposed inside of said hub;

drive shaft operable to be drivingly rotated about its axis and having one end abutting said hub nut;

drive shaft bevel gear fixed to said drive shaft engaging said propeller blade bevel gear wherein a rotation of said drive shaft will cause said blade, operable to be stored in a folded position before leaving a launching mechanism, to be nutated to a deployed position after launch.

2. The apparatus of claim 1 wherein said first hole is diametrically large enough for assembling said drive shaft and said drive shaft bevel gear by passing said drive shaft and said bevel gear through said first hole into said chamber.

3. The apparatus of claim 1 further comprising a stopper device configured to prevent said propeller blade from nutating beyond an operational configuration.

4. The apparatus of claim 3 wherein said stopper device comprises a spring detent imbedded inside of said drive shaft wherein said spring detent engages said hub nut when said propeller blade nutates to said operational configuration.

5. The apparatus of claim 3 wherein said stopper device comprises a thread formed on said drive shaft; a spline in threaded engagement with said threaded shaft; and an adjusting device operable to limit the distance traveled by said spline upon said threaded shaft.

6. The apparatus of claim 5 wherein said adjusting device comprises a threaded bolt with an elevated head which is accepted into a threaded hole located on a base of said spline where said elevated head extends between said base of said spline and a mating surface on said drive shaft.

7. The apparatus of claim 1 further comprising a friction reducing device disposed between said hub nut and said drive shaft.

8. The apparatus of claim 7 wherein said friction reducing device comprises a ball bearing.

9. The apparatus of claim 1 further comprising a friction reducing substance applied between said hub nut and said drive shaft to reduce friction.

10. The apparatus of claim 1 further comprising a sheer pin located at said base of said hub to statorize said propeller hub to a projectile prior to deploying said propeller assembly.

11. The apparatus of claim 1 further comprising a plurality of journals placed equal distance around a circumference of said top wherein an individual propeller blade fits within each journal, an individual propeller bevel gear is fixed to each propeller blade, and each propeller bevel gear is engaged with said drive shaft bevel gear.

12. The apparatus of claim 1 wherein said outer wall of said hub nut is threaded and said hole in said hub is threaded to receive said hub nut.

13. A method for deploying a propeller assembly from a folded configuration to a deployed, operational configuration, the method comprising:

statorizing a propeller hub relative to a projectile body with a sheer pin;

providing a propeller blade having a base and a bevel gear attached to said base rotatably attaching said propeller blade to said hub by inserting said blade through a journal formed in said hub and engaging said base into said journal;

nutating said propeller blade relative to said hub from a folded configuration to a radially outwardly extending operative position by rotating a drive shaft with a prime mover which in turn rotates a drive shaft bevel gear fixed to said drive shaft which in turn rotates a propeller blade bevel gear which is engaged with said drive shaft bevel gear;

preventing said propeller blade from nutating past an operational configuration;

stressing said sheer pin with force exerted by said drive shaft attempting to rotate said propeller assembly until said sheer pin breaks; and rotating said propeller blade in unison with rotation of said drive shaft.

14. The method of claim 13 wherein the step of preventing said propeller blade from nutating past said operational configuration includes the step of extending a spring detent located within said drive shaft into a cavity located inside of a propeller hub nut to prevent said propeller blade from nutating past said operational configuration.

15. The method of claim 13 wherein the step of preventing said propeller blade from nutating past said operational configuration includes the step of placing an axially translating threaded spline onto a tapered and threaded end of said drive shaft and including an adjusting device to limit the distance traveled by said spline upon said threaded shaft.

16. The method of claim 15 wherein the step of including an adjusting device includes placing a threaded bolt with an elevated head into a threaded hole located on a base of said spline where said elevated head of bolt extends between base of said spline and a mating surface on said drive shaft.

17. The method of claim 13 further comprising the step of reducing friction between said hub nut and said drive shaft.

18. The method of claim 17 wherein the step of reducing friction between said hub nut and said drive shaft includes applying a friction reducing substance between said hub nut and said drive shaft.

19. The method of claim 17 wherein the step of reducing friction between said hub nut and said drive shaft includes placing a ball bearing within adjacent cavities located in the axial center of said drive shaft and in a hub nut, fitted within a top of said hub, wherein said hub nut is adjacent to the axial center of said drive shaft.

20. A projectile launched from a launcher with a launch area large enough to accommodate only said projectile where said projectile employs a propeller diametrically larger than said projectile and said launcher area prior to nutating to an operational configuration, said projectile comprising:

a projectile body;

a prime mover attached to said body;

a propeller hub;

a propeller attached to said hub, nutatable relative to said attachment to said hub;

a drive shaft attached to said prime mover and operable to nutate said propeller relative to said hub;

a sheer pin where a first end is fixed to said propeller hub and a second end is fixed to said projectile body; and a stopper device prohibiting said propeller from nutating beyond an operational configuration wherein when said sheer pin brakes said prime mover is operable to rotate said hub and said propeller relative to said body.

* * * * *